United States Patent [19]

Foresta et al.

[11] 3,842,209

[45] Oct. 15, 1974

[54] TELEPHONE ANSWERING INSTRUMENT AND SYSTEM WITH REMOTE CONTROL

[75] Inventors: Francis A. Foresta, Paramount; Elmer C. Bonsky, Long Beach, both of Calif.

[73] Assignee: T.A.D. Avanti, Inc., Paramount, Calif.

[22] Filed: Sept. 20, 1973

[21] Appl. No.: 399,153

Related U.S. Application Data

[60] Continuation of Ser. No. 321,695, Jan. 8, 1973, abandoned, which is a division of Ser. No. 238,470, March 27, 1972, abandoned.

[52] U.S. Cl. .......... 179/6 E
[51] Int. Cl. .......... H04m 1/64
[58] Field of Search .......... 179/6 R, 6 E, 6 AC, 100.1 DR, 179/100.1 UC

[56] References Cited

UNITED STATES PATENTS

| | | | |
|---|---|---|---|
| 2,784,254 | 3/1957 | Law | 179/6 E |
| 3,293,365 | 12/1966 | Mitsui | 179/6 E |
| 3,310,629 | 3/1967 | Yamamoto | 179/6 E |
| 3,337,690 | 8/1967 | Martin | 179/6 E |
| 3,508,004 | 4/1970 | Waldman | 179/6 E |
| 3,524,936 | 8/1970 | Hill | 179/6 E |

*Primary Examiner*—Raymond F. Cardillo, Jr.
*Attorney, Agent, or Firm*—Jessup & Beecher

[57] ABSTRACT

An improved telephone answering instrument and system is provided which is contructed in one embodiment to be voice-operated so that the calling party may record a message of any length within the recording capabilities of the message tape, and he is not limited to predetermined message time intervals. The system of the invention is constructed that so long as a person is talking, the answering instrument remains energized. However, when the calling party hangs up, the instrument is de-activated, in the presence of either silence on the phone line or a continuous dial tone. The improved system to be described is also susceptible to remote control upon the receipt of a coded control signal, whereby the recorded messages in the instrument may be played, for example, over the phone line for receipt at a remote point, and they may then be cancelled or accumulated, all under the control of the remote caller. The system responds to a particular tone frequency received from the remote point to cause its message storage tape to be automatically returned to its original position, and the system then automatically causes the message tape to be played, so that the messages on the message tape may be transmitted over the phone lines to the remote point.

1 Claim, 12 Drawing Figures

(Remote Signal Amplifier Circuit)
-130-

P S G
Microfork

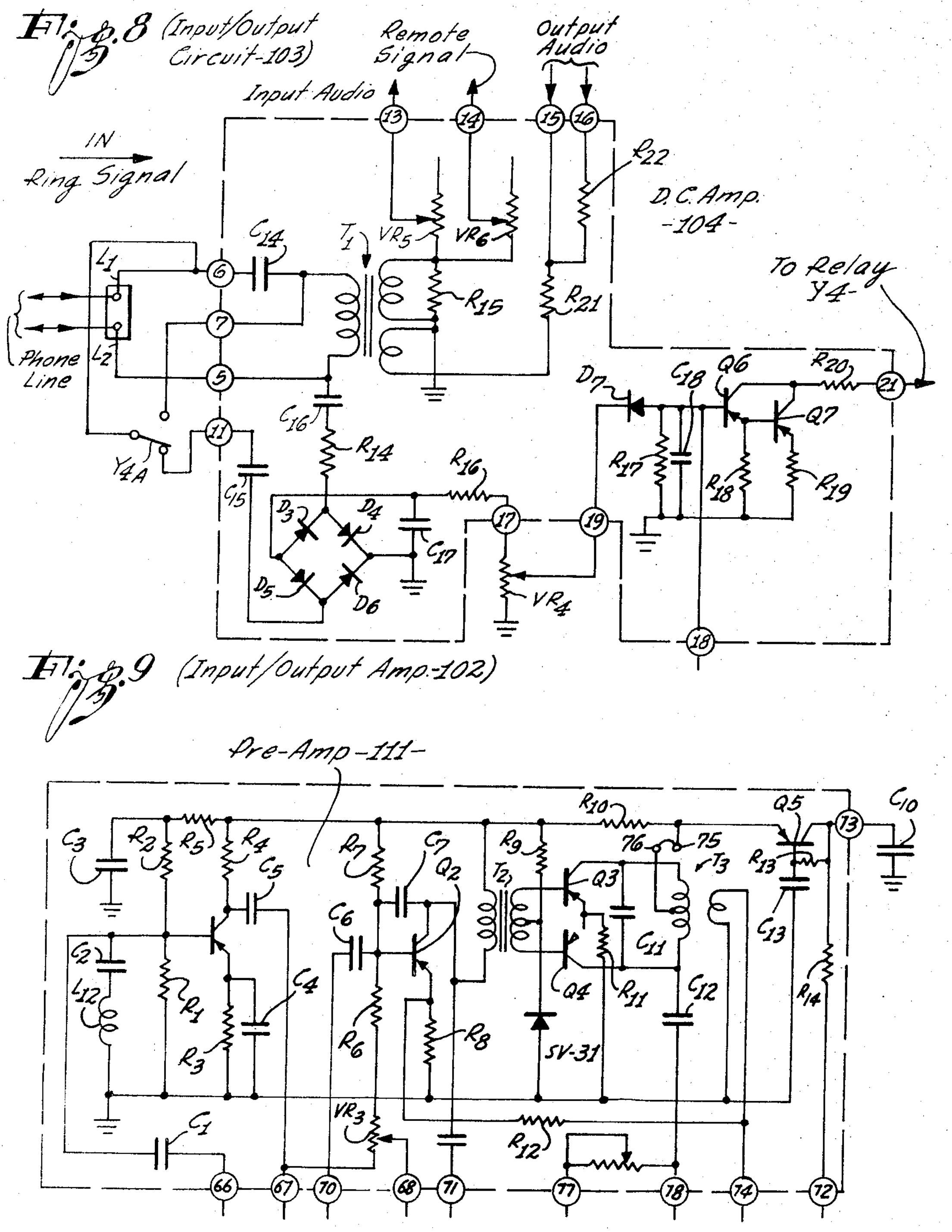
FIG. 8 (Input/Output Circuit-103), FIG. 9 (Input/Output Amp.-102)

Fig. 10 (Voice Actuation Circuit) -112-
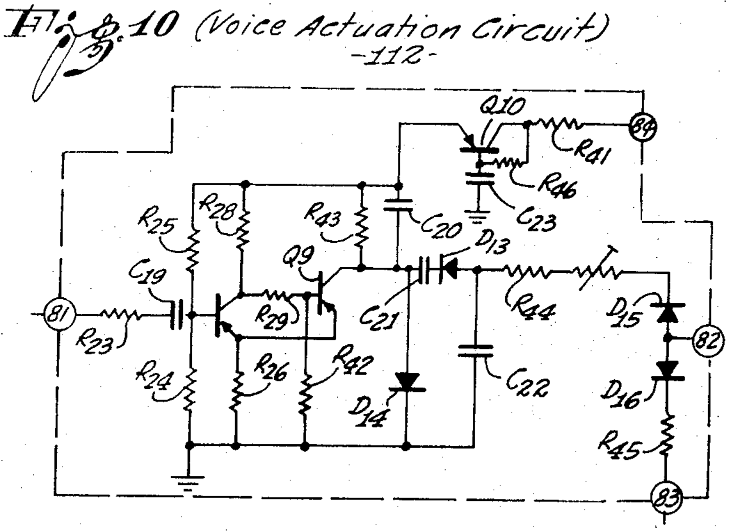
Fig. 11 (Remote Signal Amplifier Circuit) -130-
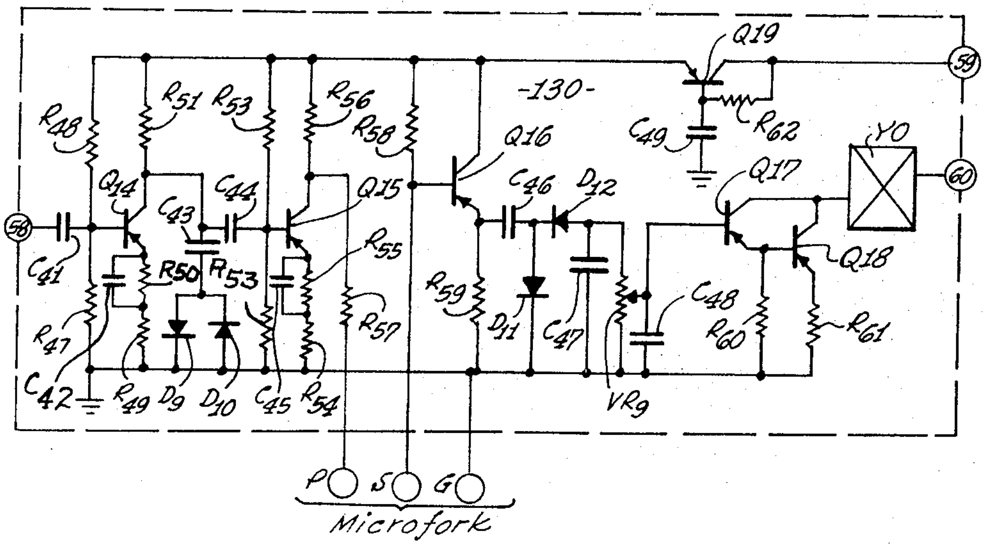
Fig. 12 (Bias Oscillator) -116-
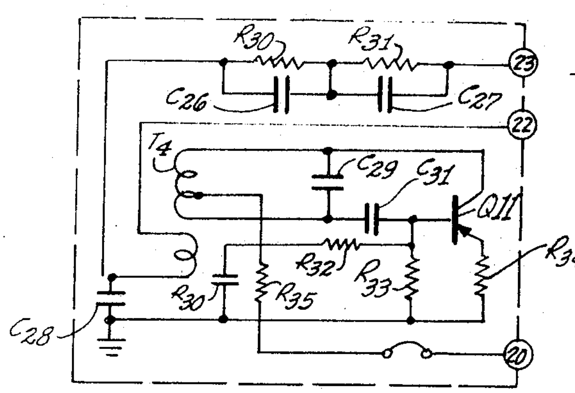

TELEPHONE ANSWERING INSTRUMENT AND SYSTEM WITH REMOTE CONTROL

This application is a continuation of application Ser. No. 321,695 filed Jan. 8, 1973, now abandoned, which is a division of application Ser. No. 238,470 filed Mar. 27, 1972, now abandoned, and entitled TELEPHONE ANSWERING INSTRUMENT AND SYSTEM.

BACKGROUND OF THE INVENTION

The telephone answering system and apparatus of the present invention is of the general type which includes a sensing circuit that responds to a ring signal on the telephone line to activate the answering instrument. When the instrument is so activated a recorded announcement is transmitted over the line to the calling party. A message recording tape is then activated within the answering instrument in order that the calling party may then record his message. In the apparatus to be described, the message recording equipment is voice-actuated, so that the calling party is not limited to any particular prescribed time interval in which to record his message. Instead, as long as he continues talking, the message is recorded.

The system and apparatus to be described is entirely solid state, and is push-button operated. The particular system is advantageous in that it is reliable and yet simple in its construction, and in that it may be installed quickly, simply and expeditiously without the need for hook-up wire connections, and without the need for electricians, mechanics or other technicians. All that is necessary in the installation of the embodiment of the instrument of the invention to be described is to plug it into a 110 volt, alternating current outlet, and into a remote telephone jack. The announcement which is to be transmitted to the callers is then recorded on an announcement tape in the instrument. A push-button switch is then depressed, and the equipment is ready for service.

Apart from its telephone answering capabilities, the instrument to be described herein may be operated as a dictating machine. When so operated, dictation may be entered into the machine, and the dictation may later be played back and transcribed. Also, and as will be described, the instrument may be set to make announcements only in response to incoming calls.

The telephone answering instrument of the invention is also advantageous in that it is readily portable, and it may be moved as often as required to any home or business area. All that it necessary is that a telephone (or telephone jack) and an alternating current outlet be available. The telephone answering instrument to be described, as mentioned above, is susceptible to remote control whereby it may transmit its recorded messages over the phone lines to any remote point, upon the receipt of a coded control signal. The answering instrument may then be reset from the remote point to record a new series of messages.

For remote control of the instrument, the telephone number is dialed which corresponds to the telephone at which the answering instrument is located, and when the answering instrument "answers" the phone, a small transmitter unit is caused to transmit a tone of a selected frequency over the phone line to the answering instrument. Upon the receipt of the appropriate tone, the instrument resets its message recording tape to its origin position, and then plays the various messages recorded on the tape over the phone line to the distant caller.

When the last message is received by the distant caller, he then can control the answering instrument by again transmitting the tone over the phone lines, so as either to reset the message recording tape in the instrument back to its origin position with the previous messages being erased; or to reset the message recording tape a position just past the last message, so that the messages on the recording tape may be preserved and further messages may be accumulated.

BRIEF DESCRIPTION OF THE DRAWINGS

FIGS. 8–12 are circuit diagrams of certain components of the electronic system of FIG. 7.

DETAILED DESCRIPTION OF THE ILLUSTRATED EMBODIMENT

Figure 1:
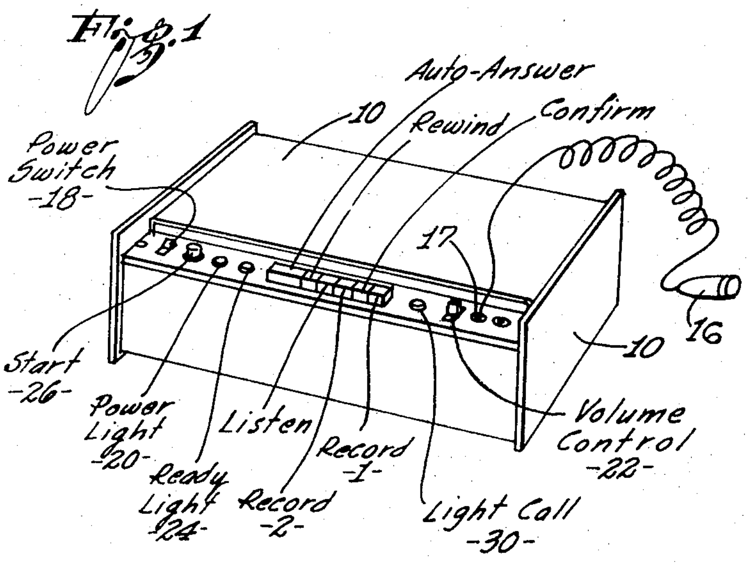
FIG. 1 is a perspective representation of a telephone answering system representing one embodiment of the invention.

The telephone answering unit shown in FIG. 1 is of the type which is used directly with the telephone line, and it may be plugged into a usual telephone jack. The apparatus, as will be described, has the feature in that it operates independently of the telephone instrument, and does not require that the telephone instrument be placed on top of it, as is the case with most prior art units. The apparatus answers on the first ring, and it can be set either to a recording mode or to an "announce only" mode, insofar as incoming calls are concerned. The unit provides either a fixed time for recording each incoming call, or a voice operated recording interval, so that an incoming call continues to be recorded so long as the calling party continues to speak. The apparatus has two-way conversation recording capabilities. It also is capable of monitoring incoming calls through an internal speaker. When the message recording tape is full of recordings of incoming calls which have been processed, the unit automatically converts to an announce only mode, so that it continues to answer incoming calls. The unit is also capable of remote control, which includes a complete playback operation, including stop, start, repeat, store and reset from any telephone anywhere.

The particular unit shown in FIG. 1 includes a housing 10 for the electrical control circuitry, and for supporting a control panel. A microphone 16 may be plugged into a receptacle 17 on the control panel for recording announcements or dictation, as will be described. A series of push-button switches are mounted on the control panel, and these are designated "Auto Answer," "Rewind," "Listen," "Confirm," "Record 1," and "Record 2." A thumb operated "On-Off" power switch 18 is also located on the control panel, and a thumb actuated volume control 22 is mounted on the control panel. In addition, a series of indicator lights designated "Power," "Ready" and "Call" are also mounted on the control panel, these lights being designated 20, 24 and 30 respectively.

In order to install and operate the system shown in FIG. 1, it is plugged into a usual 110 volt AC outlet. The unit is also plugged directly into a telephone jack, or otherwise connected to the telephone line.

As will be described, the telephone answering system is equipped with a loop announcement tape on which an announcement is recorded, so that any time a telephone ring signal is received, the announcement is automatically made to the caller. In order to record the announcement on the loop announcement tape, the power switch 18 is first switched off, and the power light 20 is then out. The microphone 16 is then plugged into the jack 17 on the control panel of the instrument, and the volume control 22 is turned to a predetermined position. The "Record 1" push-button switch is then depressed, and the power switch 18 is turned on. The "Ready" light 24 will then glow, and the loop announcement tape will automatically set itself to its origin position, at which time the "Ready" light 24 will be extinguished. The "Start" push-button switch 26 is then pushed and released, and the announcement to be recorded on the loop tape is spoken into the microphone 16. In a typical embodiment, the loop announcement tape is controlled so that twenty seconds, for example, are provided for recording the announcement. After the announcement has been recorded, the microphone 16 should be unplugged.

To confirm the announcement, the power switch 18 is turned off and the "Confirm" push-button switch is then depressed and the power switch is turned on. The announcement is then reproduced by a speaker SP (FIG. 7) in the instrument.

The instrument also includes a message tape on which the incoming calls are recorded. The message tape, as will be described, is wound from a supply reel to a take-up reel. After the announcement has been recorded on the loop announcement tape, in the manner described above, the "Rewind" push-button switch is depressed so as to rewind the message tape and place it at its "Start" position. The instrument is now conditioned to answer incoming calls automatically. In order to set the instrument for such a function, the power switch 18 is turned off, and the "Auto" push button is depressed. The power switch 18 is then turned on. At this time, the power light 20, the "Ready" light 24 and the "Call" light 30 are all on. The Call light 30 remains on until a message is received.

Therefore, if upon returning to the office, the subscriber finds that his "Call"light 30 is still on, he does nothing because there are no recorded messages. However, if the "Call" light 30 is off, he turns the power switch 18 to off, and then pushes the "Rewind" push-button switch. He then turns the power switch on, and waits until the "Call" light 30 is energized, indicating that the message tape has been rewound. The power switch 18 is again turned off, and the "Listen" push-button switch is pressed. The power switch is turned on and the message tape is activated so that all the recorded messages are reproduced through the speaker SP (FIG. 7) of the instrument. The volume control 22 may be adjusted to any desired volume level.

In order to erase the messages, the power switch 18 is turned off, and both the "Rewind" and "Record 2" push-button switches are depressed at the same time. The power switch 18 is then turned on and when the "Call" light 30 is energized, indicates that the message tape has been returned to its origin position, and that the previous calls have been erased. The power switch is then turned off, and the automatic answer switch "Auto"is depressed. Then the power switch is turned on and the instrument is ready to record additional incoming calls.

The instrument of FIG. 1 may be used as a dictating machine, if so desired. For that purpose, the power switch 18 is turned off and the microphone 16 is plugged into the jack 17. The "Record 2" push button is depressed, and the volume control 22 is set to a desired recording level. The power switch 18 is turned on, and messages may be dictated into the microphone 16 to be recorded on the message tape. To replay the dictation, the power switch 18 is turned off, and the "Rewind" push button is depressed.

The power switch 18 then is turned on to return the message tape to its origin position, as indicated by the energization of the "Call" light 30. The power switch 18 is then turned off and the "Listen" push-button switch is depressed. Then the power switch is turned on, and the dictation is reproduced through the speaker SP (FIG. 7) of the instrument. At the end of the dictation, the power switch 18 is again turned off. To erase the dictation, the same operation as above is carried out. That is, the "Rewind" and "Record 2" push-button switches are both depressed, and the power switch is turned on. The "Call" light 30 will be energized when the message tape has returned to its origin position, at which time the previous recordings on the tape will have been erased.

Incoming calls may be listened to by setting a monitor switch (FIG. 7) on the back of the housing 10. This connects a speaker SP (FIG. 7) into the circuit, so that incoming messages may be monitored as they are being recorded. Outgoing calls may be made merely by turning off the instrument and by using the telephone in a normal manner.

Figure 2:
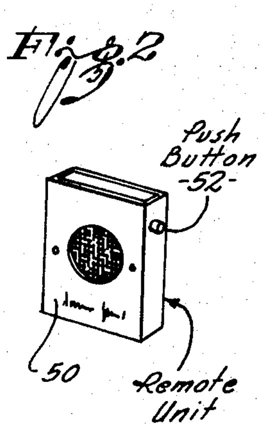
FIG. 2 is a perspective representation of a remote control transmitter unit which may be used to activate the instrument of FIG. 1 from a remote point by transmitting an appropriate tone signal over the phone lines.

A remote control unit 50 is shown in FIG. 2 which includes a push-button control 52. The remote unit permits the instrument of FIG. 1 to be operated from a remote point. This is achieved by dialing the phone number of the telephone serviced by the instrument, and by then depressing the push button 52. This causes the unit 50 to emit a distinct tone which is transmitted over the phone line and which is picked up by the circuitry of the instrument 10.

When the remote unit 50 is operated from the remote point, the message tape in the instrument 10 is caused to rewind to its origin position, and it is then caused to move forward so that the various messages recorded on the tape may be reproduced and transmitted by the telephone 12 over the phone lines to the remote point at which the caller is situated. At the end of the transmission of the messages to the remote point, the remote unit 50 should again be actuated in order to stop the message tape in the instrument of FIG. 1, so that it is ready to receive and record additional messages. Otherwise, the tape continues to run and no more messages can be received by the instrument until the "Rewind" push-button switch is depressed for the normal rewind operation as described above, or until further remote controls are effectuated, as will be described.

Figures 3, 4, 5, 6:
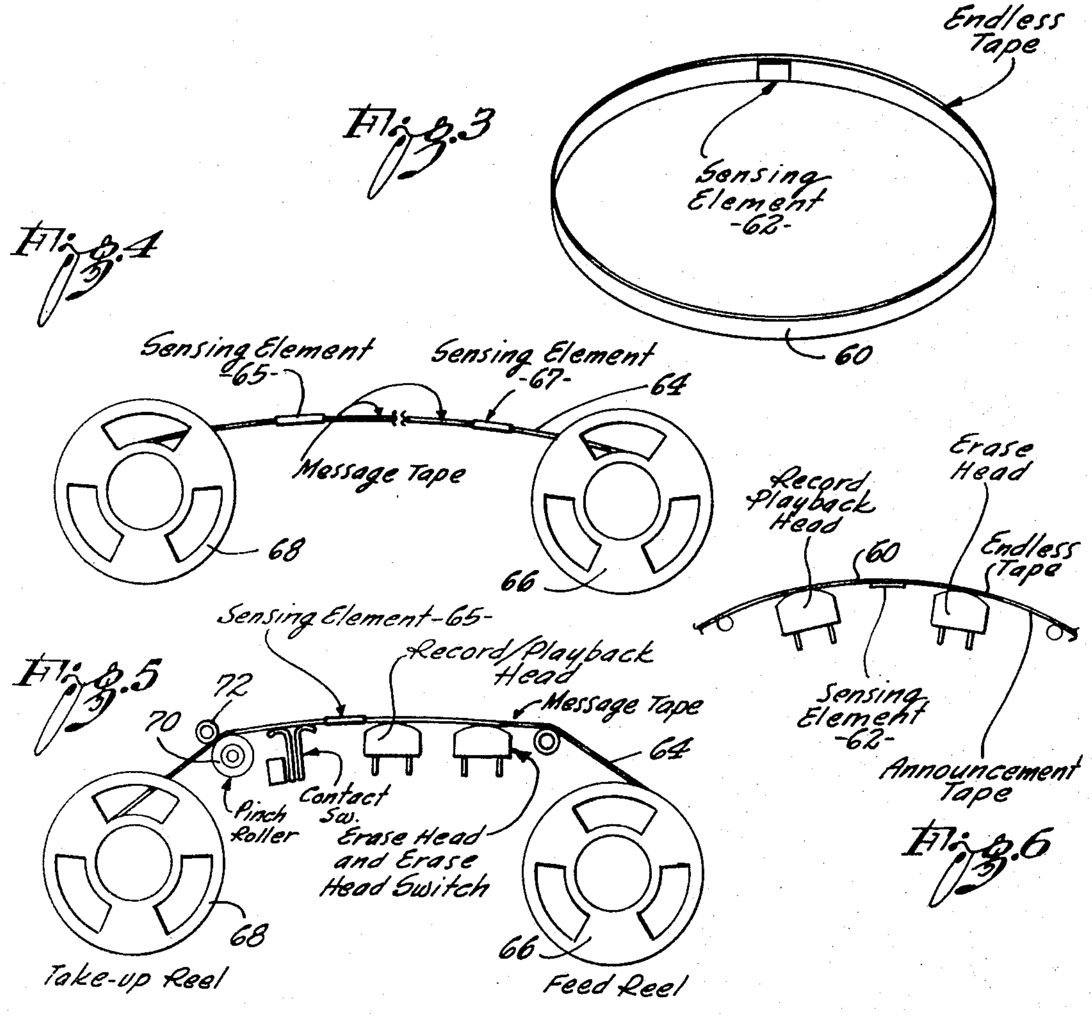
FIG. 3 is a schematic representation of the endless magnetic tape on which the announcements are recorded.
FIG. 4 is a schematic representation of the message tape, together with its take-up and feed reels.
FIG. 5 shows schematically further components associated with the message tape, including the "record/-playback" transducer head, erase head, and other components.
FIG. 6 is a further representation of other components associated with the announcement tape, including its record/playback head and erase head.

As shown in FIG. 3, the instrument includes a loop magnetic announcement tape 60 on which the announcement to be transmitted over the telephone line is recorded. The announcement is recorded on tape 60 by means, for example, of a record/playback head (RPH–1) shown in FIG. 6, and the announcement may be erased from the tape by means of an erase head (EH–1) shown in FIG. 6. The erase head (EH–1) includes a switch (HSW–1), and the switch is actuated by a sensing element 62 which is affixed to the announcement tape 60. The switch may be replaced by any known type of tape sensing switch, if so desired. The announcement tape 60 is driven by a pinch roller assembly (not shown) when a solenoid SD–1 (FIG. 7) is energized, and the announcement tape moves from right to left in FIG. 6. When the sensing element 62 passes across the erase head (EH–1), it actuates the head switch (HSW–1) to stop the tape. The announcement tape is actuated whenever the solenoid (SD–1) (FIG. 7) is energized. A microswitch SD–1–SW (FIG. 7) is associated with the announcement tape transport. This switch is operated whenever the announcement tape transport is actuated, and it serves to switch the circuitry to a transmit mode so that the recorded announcement may be transmitted over the telephone line, as will be described.

A message tape, designated 64 in FIGS. 4 and 5, is fed from a feed reel 66 to take-up reel 68, and it moves forward from right to left in FIGS. 4 and 5. The message tape 64 has sensing elements 65 and 67 affixed thereto at the beginning and end of the tape, respectively. The message tape is driven by a pinch roller assembly 70 shown in FIG. 5, which is selectively moved against a rotating capstan 72 to drive the tape when a solenoid (SD2) (FIG. 7) is energized. A record/playback head (RPH–2) is provided in conjunction with the message tape 64, as well as an erase head (EH–2).

The erase head includes a head switch (HSW–2), and whenever the sensing element 67 passes the switch (HSW–2), as the tape is moving from right to left, it indicates the end of the tape and actuates the switch to cause the tape movement to stop. This latter head switch, likewise, may be replaced by any known type of tape sensing switch. During rewind, the tape 64 is moved from the left to the right, as it is rewound on the feed reel 66 when a solenoid SDR (FIG. 7) is engaged. Then as the sensing element 65 passes the (HSW–2) switch, it causes the mechanism to stop, since the tape is then indicated as fully rewound. Switch contacts designated "Contact-SW" are also provided in conjunction with the tape 64, and these are closed when the element 67 engages the switches designating the end of the tape.

Figure 7:
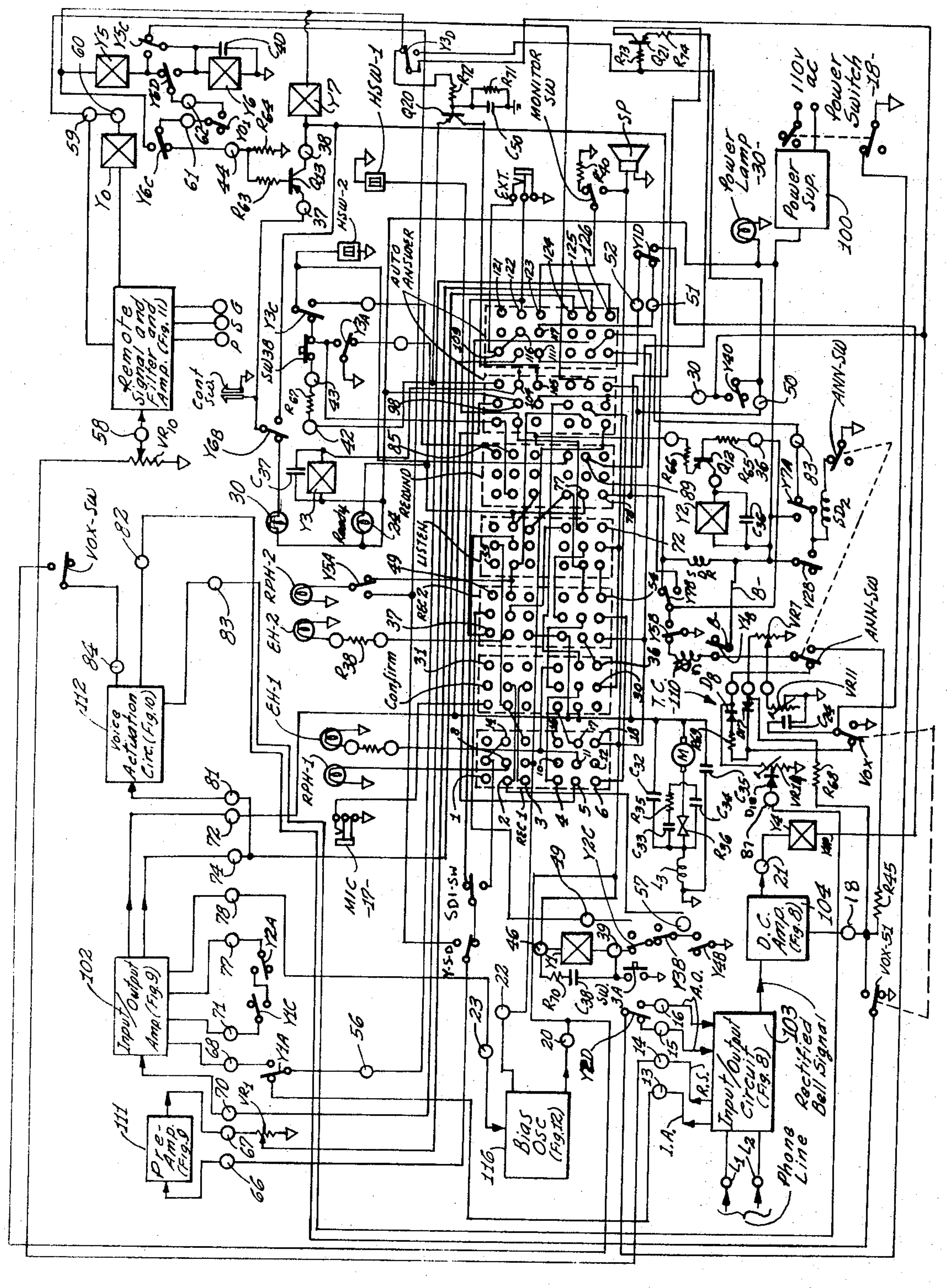
FIG. 7 is a diagram, partly in block form and partly in circuit detail of the electronic system of the invention.

As shown in the diagram of FIG. 7, for example, the instrument may be connected directly to the telephone line, as designated by the terminals 5 and 6 in FIG. 7, so as to respond to the ring signals on the line.

The push-button switches described in conjunction with FIG. 1 are six-pole, double-throw switches as shown in FIG. 7. For example, when the "Record 1" push-button switch is not actuated, its common terminals 2, 8 and 14 connect respectively with the upper terminals 1, 7 and 13, and its lower common terminals 5, 11 and 17 connect respectively with its upper terminals 4, 10 and 16. However, when the push-button switch is actuated, its common terminals 2, 8 and 14 connect respectively with its lower terminals 3, 9 and 15, whereas its common terminals 5, 11 and 17 connect respectively with its lower terminals 6, 12 and 18. This also applies to the "Hold" push-button switch, the "Record 2" push-button switch, the "Listen" push-button switch, the "Rewind" push-button switch, and the "Auto Answer" push-button switch.

As a preliminary setting for the system, it will be assumed that the "Auto Answer" push-button switch has been depressed, so that the system is in the stand-by mode awaiting an incoming ring to set it in operation. For that mode, the common terminals 92, 98, 104, 110, 116 and 122 of the "Auto Answer" push-button switch are connected respectively to the terminals 93, 99, 105, 111, 117 and 123; and the common terminals 95, 101, 107, 113, 119 and 105 are connected respectively to the terminals 96, 102, 108, 114, 120 and 126.

For the actuated position of the "Auto Answer" switch, and when the power switch 18 is on, the power supply 100 in FIG. 7 is energized, so that a negative direct voltage is applied to the lead designated B–. This negative voltage causes the Power lamp 20 to be energized. Also, the message tape is assumed to be at its origin position, so that the element 65 of FIG. 5 closes the switch CONT-SW, which is also shown in FIG. 7, so that the "Call" lamp 20 also is energized. The Ready lamp 24 is also on, as its path is returned through the normally closed contact Y3A of FIG. 7 to ground.

Now, should a ring signal be received on the phone line, the signal is introduced by way of input terminals $L_1$ and $L_2$ to the input and output circuit 103 of FIG. 7, and it appears across a ring rectifier. As shown in FIG. 8, the ring rectifier is made up of diodes D3, D4, D5 and D6; a pair of capacitors C15 and C16, each having a capacity, for example, of 0.50 microfarads; and a resistor R14, having a resistance of 50 kilo-ohms, connected as shown in FIG. 8. The ring signal is introduced to the rectifier through the normally closed relay terminals Y4A (FIG. 8). The resulting rectified signal charges a grounded capacitor C17 of 50 microfarads, and appears as a direct current voltage across a 50 kil-ohm resistor R16 and a potentiometer VR4 shunting the capacitor. The potentiometer VR4 serves as a ring signal sensitivity control.

The ring signal is introduced to a direct current amplifier 104 through a silicon diode D7, the direct current amplifier being formed of a pair of PNP transistors Q6 and Q7 and associated circuitry, connected as shown in FIG. 8. The direct current amplifier includes a 22 kil-ohm resistor R17, a 50 microfarad capacitor C18 connected to ground and to the base of the transistor Q6, a 500 resistor R18 connected to the emitter of the transistor Q6 and a 10 ohm resistor R19 connected to the emitter of the transistor Q7, both the resistors R18 and R19 being grounded.

The direct current amplifier 103 now draws current through a 100 ohm resistor R20 and through a relay Y4 (FIG. 7) to energize the relay. The energization of the relay Y4 causes the contact Y4A close (FIG. 8) placing the primary of a transformer T1 across the input terminals $L_1$ and $L_2$ through a 0.1 micromicrofarad capacitor C14. The relay contacts Y4B also close when the relay Y4 is energized, causing the relay Y1 to be energized. When the relay Y1 is energized, the contacts Y1A close so that incoming messages may be fed to the audio amplifier circuit 102 of FIG. 7.

The audio amplifier circuit 102, as shown in FIG. 9, includes a 10 kilo-ohm resistor R6, a 120 kilo-ohm resistor R7, a 300 picofarad capacitor C7, and a 50 ohm resistor R8 connected to the transistor Q2, as shown. The output from the transistor stage Q2 is introduced through a transformer T2 to a push-pull amplifier stage comprises of a pair of transistors Q3 and Q4, and which includes a 6 kilo-ohm resistor R9, a 1 kilo-ohm resistor R10, a 10 kilo-ohm resistor R11, and a temperature sensitive device, such as a varistor SV31, connected as shown. The audio amplifier also includes an output transformer T3 whose primary is shunted by a .05 microfarad capacitor C11. The secondary of the transformer T3 is connected back to the emitter of the transistor Q2 through a 2 kilo-ohm resistor R12, and is connected to an output terminal designated 74. A PNP transistor Q5 is also included in the amplifier circuit, and its emitter is connected to the resistor R10 and to the midpoint of the primary of the output transformer T3. The collector of the transistor Q5 is connected to a 10 ohm resistor R14 and to a 5 kilo-ohm resistor R13, as well as to a grounded capacitor C10 of 1,000 microfarads. The base of the transistor Q5 is connected to a grounded 100 microfarad capacitor C13.

When the relay Y1 is energized, it also closes the contacts Y1B so as to connect the negative lead (B–1) to a timer circuit 100 (FIG. 7). The timer circuit is energized through normally closed contacts of one section of an AnnounceRecord switch. These contacts are connected through a diode D8 in a timer circuit to a 400 ohm resistor R69. The resistor R69 is connected back through a diode D19 to a 100 kilo-ohm potentiometer VR7. The potentiometer VR7 is connected to a further 10 kilo-ohm potentiometer VR11 which, in turn, is connected to ground. The potentiometer VR7 is also connected through a 5 kilo-ohm resistor R68 which is connected back to the DC amplifier 104 and, by way of terminal 18 of that amplifier to the base of the transistor Q6 (FIG. 8).

The aforesaid contacts of the Announce-Record switch are also connected to a grounded potentiometer VR14 having a resistance of 10 kilo-ohms. The output terminal 82 of the voice actuation circuit 112 is connected to that potentiometer through a silicon diode D18. The terminal 82 of the voice actuation circuit is connected by way of one section of a Vox-SW switch to the input terminal 18 of the DC amplifier 104. The Vox-SW switch has a further section with normally closed contacts connected to a capacitor C24 and to the junction of resistor 69 and diode D19, and with normally open contacts connected to ground. The capacitor C24 may have a capacity of 100 microfarads and it is grounded.

The Vox-SW switch has yet another section connected to the terminal 84 of the voice actuation circuit. When the three sections of the Vox-SW switch are in their illustrated positions, the system is set for a predetermined time interval for recording calls on the message tape, the time interval being established by the discharge time of the capacitor C24 through the various resistances and potentiometers associated therewith. However, when the three sections of the Vox-SW switch are in the other position, the time interval of each message is controlled by the output from the voice actuation circuit 112, so that as long as the calling party continues talking, his message is recorded on the message tape.

The latter control is accomplished by the voice actuation circuit 112, as shown in circuit detail in FIG. 10. In a manner to be described, the audio signals representing the incoming calls are applied to the input terminal 81, and are then applied to a flip-flop circuit formed by the transistors Q8 and Q9. The terminal 81, as shown, is connected to a 3.3 kilo-ohm resistor R23 which, in turn, is connected to a 7 microfarad capacitor C19. The capacitor C19 is connected to the junction of a pair of resistors R24 and R25 and to the base of the transistor Q8. The resistor R24 is grounded, and it has a resistance of 417 kilo-ohms. The resistor R25, on the other hand, has a resistance of 120 kilo-ohms. The collector of the transistor Q8 is connected to a 6.8 kilo-ohm resistor R28 and to an 8.2 kilo-ohm resistor R29.

The emitter of the transistor Q8 and the emitter of the transistor Q9 are connected to a common grounded 47 ohm emitter resistor R26. The resistor R29 is connected to a grounded 4.7 kilo-ohm resistor R42 and to the base of the transistor Q9. The collector of the transistor Q9 is connected to a 6.8 kilo-ohm resistor R43. The resistors R25, R28 and R43 are all connected to the emitter of a voltage stabilizing transistor Q10. The base of the transistor Q10 is connected to a grounded 100 microfarad capacitor C23 and to a resistor R46 of 4.7 kilo-ohms. The collector of the transistor Q10 and the resistor R46 are connected through a 10 ohm resistor R41 to the terminal 84 of the voice actuation circuit. As shown in FIG. 7, this terminal is connected to the third section of the Vox-SW switch, so that the voice actuation circuit 112 is energized only when the Vox-SW switch is placed to the other position.

The collector of the transistor Q9 is connected to a 10 microfarad capacitor C21 and to the anode of a silicon diode D14. The capacitor C21 is connected to the cathode of a further silicon diode D13. The cathode of the silicon diode D14 is grounded. The anode of the silicon diode D13 is connected to a grounded capacitor C22 of 200 microfarads and to a 4.7 kilo-ohm resistor R44. The resistor R44 is connected to a 20 kilo-ohm potentiometer VR13 which, in turn, is connected to the cathode of a silicon diode D15. The anode of the silicon diode D15 is connected to the output terminal 82 and to the anode of a silicon diode D16. The cathode of the silicon diode D16 is connected through a 10 kilo-ohm resistor R45 to the output terminal 83.

In the voice actuation circuit of FIG. 10, whenever the input signal at the input terminal has positive peaks in excess of 33 millivolts, for example, the normally conductive transistor Q8 is rendered non-conductive which, in turn causes the normally non-conductive transistor Q9 to become conductive. This results in negative pulses appearing at the collector of the transistor Q9 as the capacitor C20 discharges. These pulses are rectified by the diodes D13 and D14, and a negative charge is produced across the capacitor C22.

For a discontinuous audio signal produced by the normal speech of a calling party, the aforesaid positive peaks are spaced sufficiently to cause the capacitor C20 in the time constant circuit C20/R43 to charge and discharge. However, should the calling party hang up so that the discontinuous audio signals are replaced by silence, the transistor Q9 becomes continuously non-conductive and no further current pulses flow through the capacitor C21 to be rectified by the diodes D13 and D14, and the capacitor C22 loses it charge.

Likewise, if a calling party hangs up, and a continuous dial tone appears on the line, so that the transistor Q9 is essentially continuously conductive, rather than intermittently conductive as is the case upon the peaks of the discontinuous voice signals, the time constant of the circuit C20/R43 is such that the capacitor C20 charges up and retains its charge for the duration of the dial tone. The charge on capacitor C20 now blocks any flow of current into the capacitor C22, so that again the capacitor C22 loses its charge. Only so long as the capacitor C22 remains charged will the relay Y4 remain energized to connect the system to the telephone lines. Therefore, when the calling party stops talking, and a dial signal, or no signal at all, appears on the telephone line, the capacitor C22 will discharge and the system will be disconnected from the phone line.

As mentioned above, the initial energizing of the relay Y4 causes the contacts Y4B to close, so that the relay Y1 is energized to set the system to the announcement transmitting mode. It will be appreciated that so long as the relay Y1 is energized, the timing cycle of the timer or of the voice actuated circuit does not begin. This is because the capacitor C24 of the timer circuit 100 is maintained in its charged state during the announcement mode by the closed contacts Y1B, so that the appropriate bias is applied directly to the DC amplifier 104 to hold the relay Y4 energized.

It is only after the relay Y1 is de-energized and the system switched to its message receiving and recording mode by the energization of the relay Y2, that the timing cycle begins. The relay Y4 is de-energized a certain time after the beginning of the message recording mode to disconnect the system from the phone line. The particular time interval depends upon whether the system is in the fixed message recording time mode, or is set to the voice actuated message recording time mode.

The energizing of the relay Y4 when the system is first switched from its stand-by mode to its announcement mode by the receipt of a telephone ring signal also causes the relay contacts Y4D to close to energize the motor M. The motor circuit M, as shown in FIG. 7, includes a filter choke L3, and it also has an associated filter network including capacitors C32, C33, C34 and C35. These capacitors have values of 0.1, 10, 0.01 and 0.5 microfarads, respectively. The filter network also includes a resistor R36 having a resistance, for example, of 10 ohms.

The motor M remains energized so long as the system is operational. The motor drives both the announcement tape 60 and the message tape 64 when their corresponding pitch roller assemblies are actuated by the selective energization of the solenoids SD1 and SD2. When the relay Y1 is energized, the system is set to its announcement mode, and the relay contacts Y1B close to charge the capacitor C24 in the timer circuit 110 so as to apply the necessary bias to the DC amplifier 104 to hold the relay Y4 energized. The solenoid SD1 is also energized during this mode, and this solenoid actuates the pinch roller assembly associated with the announcement tape transport (not shown) and causes the announcement tape to be driven. The playback head RPH–1 associated with the announcement tape senses the announcement on the tape, and applies the audio signals corresponding to the announcement through the microswitch SDI–SW (which is now actuated) to the pre-amplifier circuit 111, which is shown in greater detail in FIG. 9. The output from the pre-amplifier is then applied to the input/output amplifier 102 and the amplified output from the latter amplifier is applied to the input/output circuit 103, so that the announcement may be applied to the telephone line.

The pre-amplifier circuit 111, as shown in FIG. 9, includes a PNP transistor Q1, and the incoming signal from the head RPH-1 during the announcement mode is applied to the base of the transistor Q1. A series resonant trap circuit including a 0.002 capacitor C2 and an inductance coil L1 is connected between the base of the transistor Q1 and ground. Likewise, a pair of biasing resistors R1 and R2 have their common junction connected to the base of the transistor Q1. The resistor R1 may have a resistance of 10 kilo-ohms, and it is grounded. The resistor R2 may have a resistance of 10 kilo-ohms, and it is grounded. The resistor R2 may have a resistance of 40 kilo-ohms, and it is connected to the junction of a 2 kilo-ohm resistor R5 and a grounded 50 microfarad capacitor C3.

The collector of the transistor Q1 is connected to a 3 kilo-ohm resistor R4 and to a capacitor C5 of, for example, 10 microfarads. The emitter of the transistor Q1 is connected to a grounded 1 kilo-ohm resistor R3, which is shunted by a 30 microfarad capacitor C4. The base of the transistor Q1 is connected to the input terminal 66 of the pre-amplifier through a 10 microfarad capacitor C1, and the collector of the transistor Q1 is connected through the capacitor C5 to the output terminal 67 of the pre-amplifier.

As shown in FIG. 7, the output terminal 67 is connected to a grounded 10 kilo-ohm potentiometer VR1. The series resonant trap C2, L1 serves to keep the signal from the bias oscillator 116 out of the pre-amplifier circuit. The potentiometer VR1 serves as a gain adjuster, and it controls the amplitude of the output signal from the pre-amplifier applied to the input of the amplifier 102 through the terminal 70. The terminal 70 is connected to a 10 microfarad capacitor C6, which, in turn, is connected to the base of a transistor Q2 and to the junction of a pair of resistors R6 and R7. The resistor R6 is grounded, and it has a value of 10 kilo-ohms. The resistor R7 has a value of 120 kilo-ohms.

The collector of the transistor Q2 is coupled back to the base through a 300 picofarad capacitor C7 and to the primary of a coupling transformer T2. A further grounded potentiometer VR3 is connected to the terminal 67, and its movable contact is connected to a further terminal 68. A terminal 71 is coupled through a capacitor C9 to the junction of the collector of the transistor Q2 and the primary of the transformer T2. The resistors R4, R5, R7 and R9, as well as the primary of the transformer T2 are connected to a 1 kilo-ohm resistor R10. The resistor R10 is connected to the emitter of a voltage regulator transistor Q5, the collector of which is connected through a 10 ohm resistor R14 to a terminal 72. The unidirectional excitation voltage for the amplifiers 102 and 111 is derived by way of the terminal 72, and the voltage is regulated by the transistor Q5. The collector of the transistor Q5 is connected to a 100 microfarad grounded capacitor C10, and to a 5 kilo-ohm resistor R13. The resistor R13 is connected to the base of the transistor Q5 and to a grounded capacitor C15.

The secondary of the transformer T2 is connected to a pair of PNP transistors Q3 and Q4 which are connected as a usual push-pull amplifier, the collectors of which are connected to the primary of an output transformer T3. A capacitor C11 is shunted across the collectors of transistors Q3 and Q4, and this capacitor has a value of 0.05 microfarads. A grounded 10 ohm resistor R11 is connected to the emitters of the transistors Q3 and Q4. The 6 kilo-ohm resistor R9 is connected to the mid-point of the secondary of the transformer T2 and to a grounded Varistor designated SV–31.

The secondary of the output transformer T3 is connected to ground and to the output terminal 74. A feedback connection from the secondary is also made through a 2 kilo-ohm resistor R12 to the emitter of the transistor Q2. A potentiometer VR8 of, for example, 5 kilo-ohms, and is connected across the terminals 77 and 78. The terminal 78 is also connected to a 10 microfarad capacitor C12 which, in turn, is connected to the primary of the output transformer T3. The mid-point of the last-named primary is connected to the emitter of the voltage regulator transistor Q5.

During the announcement mode, and as described above, the relays Y4 and Y1, and the solenoid SD1 are energized, and the announcement signal is read by the read head RPH–1, passed through the actuated switch SDI–SW, and amplified by the amplifiers 111 and 102, as described above. The amplified announcement from the audio amplifier 102 is applied to the lower winding of the transformer T1 in the input/output circuit 103 of FIG. 8 through the contact Y2D and terminal 16 of FIG. 7 and through a pair of resistors R21 and R22 of 50 and 100 ohms respectively. In this way, the recorded announcement on the announcement tape 60 is transmitted over the phone line. At the end of the announcement, the element 62 of FIG. 6 actuates the switch HSW–1, and this causes the relay Y2 to be energized. The system is now switched from its announcement mode when the relays Y4 and Y1 are energized, to its message receiving mode when the relays Y4 and Y2 are energized.

The energization of the relay Y2 is achieved through the closed contacts 92 and 93 of the actuated "Auto Answer" push-button switch, and through a 5 ohm resistor R66 connected to the emitter of the transistor Q12, the collector of which is connected the relay Y2. The other terminal of the terminal Y2 is connected the B- lead. When the relay Y2 is energized, the relay contacts Y2C are actuated so as to de-energize the relay Y1. This causes the contacts Y1B to open removing the unidirectional potential from the timer circuit 110, and initiating the timing cycle. At the same time, the contacts Y2B close energizing the solenoid SD2 which, in turn, actuates the pinch roller of FIG. 5 causing the message tape to be actuated. The incoming message from the calling party is now recorded by the head RPH–2 on the message tape.

The incoming message is amplified in the amplifier 102, and its output from terminal 78 is applied to the bias oscillator 116 by terminal 23 to modulate the alternating current bias output signal. Then, the modulated bias signal is applied to the switching contact 96, and then to the switching contact 95, and from there to the record head RPH–2 through the switch contact 56. Therefore, during the message recording mode, the incoming message signal modulates the alternating current signal from the bias oscillator, and the resulting modulated signal is recorded on the message tape by the record head RPH–2.

At the same time, the output from the input/output amplifier 102 is fed to the switch contact 110 by the output terminal 74, and from there it is switched to the switch contact 111 and through the normally closed relay contacts Y1D to the switch contact 117, and from there to the switch contact 116, and through the switch contact 109 to the extension jack marked "Ext." Therefore, the incoming messages may be monitored, merely by plugging a speaker into the extension jack "Ext." The incoming messages may also be monitored by the pseaker SP by moving the adjacent "Monitor" switch to the down position.

It will be understood, therefore, that during the announcement mode, the relays Y4 and Y1 are energized so that the announcement tape is actuated and the timer circuit 110 is set. During the message receiving and recording mode, the relay Y4 remains energized, and the relay Y2 is energized, but the relay Y1 is de-energized. When the relay Y1 is de-energized, the solenoid SD1 is de-activated so that the announcement tape is stopped at its origin poisition, as established by the closure of the switch HSW–1.

As mentioned above, so long as the message receiving and recording mode continues, the signal applied to the DC amplifier 104 by way of the input terminal 18 maintains the relay Y4 energized. At the end of the timed cycle the capacitor C24 discharges in the timer circuit 110, or during the voice actuated mode, the capacitor C22 discharges in the voice actuation circuit 112 of FIG. 10, to remove the signal from the DC amplifier 102 so that the relay Y4 is de-energized.

When the relay Y4 is de-energized, the system returns to its stand-by mode. The contacts Y4B return to their normally open position, and the relay Y1 cannot again be energized until the relay Y4 is again energized. The relay Y2 is also de-energized at this time, causing the contacts Y2B to open and thereby de-energizing the solenoid SD2 to stop the message tape. When Y4 is de-energized, the relay Y2 is de-energized since the contacts Y2C not only serve to de-energize Y1 when Y2 is energized, but also form a holding circuit for the relay Y2. Then, when the relay Y4 is de-energized the contacts Y4B open to open the holding circuit for the relay Y2, and therefore the relay Y2 also is de-energized.

The relay Y2 is shunted by a 200 microfarad capacitor C36, and the relay Y1 is shunted by a 500 microfarad capacitor C38 and a 100 ohm series resistor R70. During the transistion from the announcement mode to the message recording mode, during which the relay Y1 is de-energized and the relay Y2 is energized, the circuit C38, R70 produces a slight delay in the de-energization of the relay Y1, and an internal oscillation is set up when both Y1 and Y2 are on at the same time briefly, as the contacts Y1C and Y2A are closed setting up a regenerative feedback path in the amplifier 102. This produces a "beep" tone which is recorded on the message tape at the beginning of each message, and which serves as a message separation on the message tape.

The message tape is now ready to receive and record the incoming messages. The message tape continues to record messages until the end of tape sensing element 67 (FIG. 4) causes the switch contacts HSW-2 to close. When that occurs, the circuitry of the transistors Q20 and Q21 switches the system to the "announce-only" mode.

During the "announce-only" mode, the announcement tape continues to be activated in response to incoming messages and announcements are transmitted to the calling party. However, no further messages are recorded on the message tape.

The system is now in a "standby" mode, permitting the message tape to be rewound and re-activated, either by local or remote controls. This feature permits the message tape to be rewound by the remote control over the phone line, as will be described, and the messages on the tape to be read over the phone line even though the message tape is full.

The Rewind operation is instituted by actuating the "Rewind" push-button switch which comprises the switch contacts 73–90 in FIG. 7. This, as mentioned above, causes the contacts 74, 80 and 86 to break with the contacts 73, 79 and 85, respectively, and to engage the contacts 75, 81 and 87; and causes the contacts 77, 83 and 89 to break with the contacts 76, 82 and 88, and to engage selectively with the contacts 78, 84 and 90.

When the "Rewind" push-button switch is depressed, a ground is established at the upper end of the rewind solenoid SDR through the switch contacts 77 and 78, and through normally closed contacts Y3A of a protective relay Y3. The rewind solenoid SDR remains energized until the protective relay Y3 is energized. The relay Y3 is shunted by a 200 microfarad capacitor C37. The energizing of the solenoid SDR causes the message tape 64 of FIG. 5 to rewind until the sensing element 65 causes the switch G-SW2 to close. When that occurs, the protective relay Y3 is energized through the start switch SW3B (FIG. 7), through a 10 kilo-ohm resistor R67, through the circuit of a transistor Q20, and through switch contacts 105 and 104.

When the protective relay Y3 is energized, the normally closed contacts Y3A open to cause the rewind solenoid SDR to be de-energized, and the normally open contacts Y3A closed to form a holding circuit for the relay Y3. The normally closed contacts Y3B also open to assure that the relay Y1 is de-energized, and the normally open contacts Y3C close. When the contacts Y3C close, the message mode relay Y2 becomes energized to energize the solenoid SD2 to cause the message tape to start in its forward direction. The message tape moves forward until the element 65 moves off the switch HSW–2. When that occurs, the relay Y2 is de-energized, and the system is ready for the next cycle.

The recorded messages on the message tape 64 of FIG. 5 may be played back during a "Listen" mode by pressing the "Listen" push-button switch. This switch includes the switching contacts 55–72 of FIG. 7, and it operates in the same manner as described above in conjunction with the "Rewind" push-button switch. When the "Listen" push-button switch is actuated, the relay Y2 is energized through the normally closed relay contacts Y3A, and the relay contacts Y2B close to energize the message tape solenoid SD2. The message tape transport now draws the tape across the playback head RPH-2, and any messages recorded on the tape are sensed by the head.

The resulting output from the playback head RPH-2 during the "Listen" mode is introduced through the switch SD1-SW, which is in the illustrated position, and through the normally closed Y5D relay contacts to the input terminal 66 of the pre-amplifier 111. The signals are amplified in the pre-amplifier 111 and in the input-/output amplifier 102, and the resulting output from the amplifier 102 is passed to the speaker SP, and the recorded messages are reproduced by the speaker. The "Listen" mode continues until the sensing element 65 of the message tape in FIG. 4 contacts the head switch HSW–2 in FIG. 5 to energize the protective relay Y3. The relay Y2 is then de-energized as before, and the forward movement of the message tape is stopped since the solenoid SD2 is de-activated by the opening of the relay contacts Y2B.

In order to use the instrument as a tape recorder, the "Record-2" push-button switch of FIG. 1 is depressed to place the system in the "Record-2" mode. This switch includes the switch contacts 37–54 of FIG. 7, and the switching connections are similar to the switching described above. The microphone 16 of FIG. 1 is plugged into the MIC receptacle 17. The motor M is energized during this mode, and the relay Y2 is energized, so that the relay contacts Y2B close to energize the solenoid SD2 which, in turn, actuates the pinch roller 70 of FIG. 5 to start the message tape. The signals from the microphone are applied to the pre-amplifier. The signals from the microphone 16 plugged into the MIC receptacle 17 are passed through the switch SD1–SW (which is now in its illustrated position) to the input of the pre-amplifier 111, and then to the input-/output amplifier 102. The resulting output signals from the input/output amplifier 102 are applied by way of the output terminal 78 of the amplifier 102 and the input terminal 23 of the bias osciallator 116 to the bias oscillator. The signals modulate the alternating bias signal generated by the bias oscillator 116, and the modulated output appears at the output terminal 22 of the bias oscillator 16, and is then applied to the record head RPH–2 by way of the contacts 51 and 50 of the "Record-2" push-button switch.

The bias oscillator 116 is shown in circuit detail in FIG. 2, and it includes a PNP transistor Q11. The bias oscillator 116 also includes resistors R32, R33, R34 and R35, connected as shown, and having respective values of 25 kilo-ohms, 1 kilo-ohms, 20 ohms and 500 ohms. Also included in the oscillator circuit are capacitors C28, C29, C30 and C31, connected as shown, and these capacitors have respective values of 0.001, 0.002, 50 and 0.005 microfarads. The aforesaid capacitors and resistors are connected in circuit with a regenerative transformer T4 in the manner shown, so as to create an oscillating circuit.

The incoming audio signals are applied to a winding of the transformer T4 by way of the input terminal 23, and through a filter network made up of a pair of 10 kilo-ohm resistors R30, R31, and which are respectively shunted by capacitors C26 and C27 of 0.003 and 0.01 microfarads respectively. The other end of the winding of the transformer T4 is connected to the output terminal 22. Unidirectional excitation voltage for the circuit is achieved through the input terminal 20.

During the "Record-2" mode, the audio intelligence from the microphone 16 plugged into the MIC jack 17 is amplified in the amplifiers 111 and 102 of FIG. 7, and used to modulate the alternating current output signal of the bias oscillator 116. The modulated output from the bias oscillator 116, as mentioned above, is then applied to the record head RPH–2, so that the intelligence may be recorded on the message tape.

It should be noted that when the "Auto Answer" switch is off, the B- lead is connected by the switch contacts 98 and 97 directly to the terminal 72 to energize the pre-amplifier 112 and input/output amplifier 102 and to the motor M so that the drive motor is energized. Also, the B- is applied to the ontacts 35, 40 and 41 of the "Record-2" switch, so as to exert a bias through the 1.5 kilo-ohm resistor R38 on the erase head EH–2. This means that all previous recordings are erased by the erase head prior to the new recordings being made on the tape by the head RPH–2. As mentioned above, if the "Rewind" button is pushed at the same time as the "Record-2" button, the message tape may be erased during the rewind operation.

During the "Record-1" operation, during which an announcement is recorded on the announcement tape 60 of FIG. 6, the "Record-1" push-button switch is actuated, which includes the contacts 1–18. The erase head EH–1 is now biased through the 15 kilo-ohm resistor R37 which is connected to the B- lead by way of the switch contacts 11, 12, 18, 17, 22 and 23, so that the previous announcement is erased prior to the recording of the new announcement. As in the case of "Record-2" mode, the audio signals from the microphone 16 as plugged into the jack 17 are amplified in the amplifiers 111 and 102, and are caused to modulate the output of the bias oscillator 116. The modulated output is then applied to the record head RPH–1 through the switch contacts 8 and 9 of the "Record-1" push-button switch.

During the "Record-2" mode, the Y2 relay is energized so as to energize the solenoid SD2 to cause the message tape to move forward. During the "Record-1" mode, the relay Y1 is energized and the resulting closing of the relay contacts Y1B cause the solenoid SD1 to be energized so that the announcement tape may be moved. The audio signal from the microphone may then be recorded on the announcement tape, as described above, and this recording may continue until the sensing element 62 of FIG. 6 operates the head switch HSW–1. When that occurs, the protective relay Y3 is energized, which de-energizes the relay Y1 so that the movement of the announcement tape is stopped.

The output terminal 74 of the input/output amplifier 102 of FIG. 7 is also connected to the input terminal 81 of the voice actuation circuit 112. The circuit details of the voice actuation circuit are shown in FIG. 10. The input terminal 81 is connected to the resistor R23 having a resistance of 3.7 kilo-ohms, and the resistor is connected to a 1 microfarad capacitor C19. The capacitor C19 is connected to the base of a transistor Q8 and also to the junction of a pair of biasing resistors R24 and R25. The resistor R24 is grounded, and has a resistance of 4.7 kilo-ohms. The resistor R25 has a resistance of 120 kilo-ohms.

The emitter of the transistor Q8 is connected to the emitter of a further transistor Q9 and to a grounded 47 ohm resistor R26. The collector of the transistor Q8 is connected to a 6.8 kilo-ohm resistor R28 and to an 8.2 kilo-ohm resistor R29. The resistor R29 is connected to a grounded 4.7 kilo-ohm resistor R42 and to the base of the transistor Q9. The collector of the transistor Q9 is connected to a 6.8 kilo-ohm resistor R43 which is shunted by a 4.7 microfarad capacitor C20. The resistors R25, R28 and R43 are all connected to the emitter of a voltage stabilizing transistor Q10, the collector of which is connected to the base through a 4.7 ohm resistor 46 and through a 10 ohm resistor R41 to a terminal 84. The base of the transistor Q10 is connected to a grounded 100 microfarad capacitor C23.

The exciting potential for the voice actuation circuit is applied to the terminal 84 whenever the adjacent Vox-SW switch (FIG. 7) is set to the upper position. So long as the Vox-SW switch is in the illustrated position, the voice actuation circuit 112 is not active, and that occurs when the system is set in its timed mode, and the timer circuit 110 establishes a predetermined time interval for each message to be recorded on the message tape. As mentioned above, when the voice actuation circuit 112 is active, the messages may continue to be recorded on the message tape so long as there is an audio input to the voice actuation circuit.

The input audio signal applied to the voice actuation circuit 112 when it is energized causes an amplified signal to be produced in the collector circuit of the transistor Q9. This signal is rectified by a pair of diodes D13 and D14, and is introduced to the junction of the diodes through a 10 microfarad capacitor C21. The positive half-cycles of the audio signals are by-passed to ground through the diode D14, but the negative half-cycles draw unidirectional current into the capacitor C22, and cause the capacitor to assume a charge.

So long as the capacitor C22 remains charged, the output terminal 82 causes a negative bias to be applied to the DC amplifier 104 in FIG. 7, so that the relay Y4 is held energized, which is essential to maintain the system effectively connected to the phone lines. The timer capacitor C24 in the timer circuit 110 is disconnected and discharged at this time by the silicon of the Vox-SW switch adjacent the timer circuit. However, at the end of an incoming message, the capacitor C22 begins to discharge through the resistor R44 and through the associated potentiometer VR13 in the timer circuit 110. The parameters of the resistance-capacitance circuit are such that the discharge time constant is relatively fast, as compared with the discharge time of the capacitor C24 in the timer circuit when the system is in the fixed time message recording mode of operation.

A feature of the system of the invention is that it may be controlled from a remote point, and merely by introduring a tone of a predetermined frequency into the phone line by the unit, for example, described in conjunction with FIG. 2. The system must be in the "Auto Answer" mode in order to process the tone signal, that is, the "Auto Answer" push-button switch must be actuated. Assuming at that time that a number of previous messages have already been recorded on the message tape 34 of FIG. 5, then, upon the receipt of the tone signal, the system is automatically placed in the "Rewind" mode, so that the message tape is rewound to its origin position. The system is then placed in its "Listen" mode, and the messages recorded on the message tape are now, instead of being fed into the loudspeaker SP, it is fed through the input/output amplifier 102 to the telephone line so that the messages may be heard by the person originating the tone signal.

The system includes a remote signal filter and amplifier designated 130 in FIG. 11. The remote tone is introduced to the remote signal filter and amplifier 130 from terminal 14 of the input/output circuit 103 of FIG. 8, and it appears across a potentiometer VR10 (FIG. 7) at the input of the circuit 130, so that the received tone signal may be introduced into the circuit by way of the input terminal 58, and with a selected amplitude level divided by the adjustment of the potentiometer VR10. The remote signal is derived across a winding of the transformer T1 in the input/output circuit 103 of FIG. 6, which winding is shunted by a 600 ohm resistor R15, and the signal is applied to the remote signal amplifier circuit 130 by way of a potentiometer VR6 and output terminal 14 of the input/output circuit.

The remote signal and amplifier is shown in circuit detail in FIG. 11. It includes a pair of PNP transistors Q14 and Q15. The input terminal 58 of the circuit is connected to a 10 microfarad coupling capacitor C41 which, in turn, is connected to the base of the transistor Q14 and to the junction of a pair of resistors R47 and R48. The resistor R47 has a value of 10 kilo-ohms and is grounded, and the resistor R48 has a value of 40 kilo-ohms. The emitter of the transistor Q14 is connected to a 1 kilo-ohm resistor R50 which is shunted by a 30 microfarad capacitor C42. The resistor R50 is connected to a grounded 33 ohm resistor R49. The collector of the transistor Q14 is connected to a 3 kilo-ohm resistor R51 and to the junction of a pair of 10 microfarad capacitors C43 and C44. The capacitor C43 is connected to a pair of back-to-back grounded diodes D9 and D10. The capacitor C44 is connected to the junction of a pair of resistors R52 and R53 and to the base of the transistor Q15. The resistor R52 has a value of 10 kilo-ohms and is grounded, and the resistor R53 has a value of 50 kilo-ohms.

The emitter of the transistor Q15 is connected to a 1 kilo-ohm resistor R55 which is shunted by a 30 microfarad capacitor C45. The resistor R55 is connected to a grounded 200 ohm resistor R54. The collector of the transistor Q16 is connected to a 3 kilo-ohm resistor R56, and to a 100 kilo-ohm resistor R57. The resistor R57 is connected to a terminal P of a suitable micro-fork vibratory assembly, the assembly having a further terminal S connected to the base of a transistor Q16, and a grounded terminal G. The emitter of the transistor Q16 is connected to a grounded 5 kilo-ohm resistor R59. The base is connected to a 200 kilo-ohm resistor R58.

The emitter of the transistor Q16 is also connected to a 10 microfarad capacitor C46 to the junction of a pair of diodes D11 and D12. The cathode of the diode D11 is grounded, and the anode of the diode D12 is connected to a grounded 50 microfarad capacitor C47 and to a grounded 20 kilo-ohm potentiometer VR9. The potentiometer is connected to a grounded 10 microfarad capacitor C48 and to the base of a transistor Q17. The collector of the transistor Q17, together with the collector of a transistor Q18 are connected through the coil of a relay Y0 to the output terminal 60 which is connected to a further output terminal 59 by a jumper connection.

A voltage regulator transistor Q19 has its emitter connected to the resistors R48, R51, R53, R56, R58 and to the collector of the transistor 016. The collector of the transistor Q19 is connected to the terminal 59. A 5 kilo-ohm resistor R62 is connected between the collector and base of the transistor Q19. The base is also connected to a grounded 200 microfarad capacitor C49. When the remote signal amplifier circuit 130 is energized, a uni-directional voltage is applied to the terminal 59, this voltage being derived, for example, from the switch contacts 107 and 108 of the "Auto Answer" push-button switch, and through the closed contacts Y4D and through the "Auto Answer" switch contacts 99 and 98 to the B- lead in FIG. 7.

The micro-fork assembly is tuned, in known manner, to respond to a particular tone frequency, and only when that tone is received by the remote signal amplifier circuit 130 is the amplified tone from the transistor Q15 passed on to the transistor Q16. When that occurs, the output from the transistor Q16 is rectified so that a negative charge is produced acorss the capacitor C46 to render the transistors Q17 and Q18 conductive, so as to provide a current path for a relay Y0 (FIG. 7) to energize the relay. Therefore, when the system is in the "Auto Answer" mode, and when the proper tone is transmitted to the equipment, the relay Y0 is energized. The tone should be transmitted during the announcement interval when Y1 is also energized, so that the tone is received during the message announcement mode when both the relays Y4 and Y1 are energized, and when the "Auto Answer" push-button switch is actuated.

Now, when the proper tone is received, and the relay Y0 is energized, the contact Y01 closes, so that the relay Y5 is energized, as the circuit is completed through the normally closed contacts Y6C and Y6D, and through the grounded 40 ohm resistor R64. The relay Y6 is also energized at this time as the contacts Y5C close. The relay Y0 drops out when the tone signal stops, but the relays Y5 and Y6 remain energized. The rewind solenoid SDR is now energized as the relay contacts Y5B close, so that the message tape 64 is rewound to its origin position.' When the message tape reaches its origin position at the end of the rewind operation, the switch CONT-SW closes to energize the relay Y7. The normally closed relay contacts Y7B now opens to de-energize the solenoid SDR.

The message solenoid SD2 is now energized through the closed contacts Y7A, and the message tape 64 begins to move in its forward direction. The recorded messages on the message tape are sensed by the head RPH–2 and are applied through the closed relay contacts Y5A and Y5D and through the switch SD1-SW to the pre-amplifier 111. The amplified signals are further amplified by the input/output amplifier 102. The output from the input/output amplifier 102 is applied across the "Auto Answer" switch contacts 110 and 111, and across the closed relay contacts Y1D, and through the normally closed relay contacts Y2D, to the input/output circuit 103 for transmission over the phone lines to the person originating the tone.

It might be pointed out that during the remote mode, the relay Y2 is not energized, and the message solenoid SD2 is activated by the relay Y7, as described above. The relay Y1, however, is energized. Even though the relay Y1 is energized, the announcement tape solenoid SD1 is not energized during the remote mode because the normally closed relay contacts Y5B are now open. It might also be pointed out that during the remote mode, the negative potential B– is applied to the lead connected to the remote signal filter and amplifier 130 and to the relays Y0, Y5 and Y7, the connection being completed through the switch contacts 107 and 108, 99 and 98 of the actuated "Auto Answer" push-button switch, and through the closed relay contacts Y4D. The normally closed relay contacts Y3D energize the circuit of the transistor Q20 at this time through a 10 kilo-ohm resistor R72 connected to the base of the transistor. The base is also connected to a grounded 30 kilo-ohm resistor R71 which is shunted by a 470 microfarad capacitor C50.

After the calling party has received the messages from the message tape, he should again transmit the tone signal over the phone line. If this is done, the relay Y0 is again energized which causes the relay contacts Y0 to close shorting out the relay Y5 and causing it to be de-energized. Then, when the tone is terminated, the relay Y6 is de-energized which causes the relay Y7 to be de-energized and the message tape 64 to be stopped at that point, and the system is now in readiness to receive and record additional messages. The calling party may then transmit a further tone over the phone lines, and the further tone will set the system to the rewind mode, as mentioned above, so as to return the message tape to its origin position. At that point, the calling party may transmit yet a further tone signal to stop the message tape at its origin position, so that the system is then in readiness to receive and record an entirely new set of messages.

As mentioned above, the system may be set to an "Announce Only" mode. When in such a mode, no messages are recorded, and the system responds to incoming calls only by transmitting the announcement on the announcement tape over the phone line to the calling party. The instrument may be set to the "Announce ONly" mode by moving the Announce-Record switch from its illustrated position to its second position.

A first section of the Announce-Record switch is connected to the solenoid SD2, so that when the switch is moved to its second position, the solenoid cannot be energized so that the message tape 60 cannot be activated. A second section of the Announce-Record switch switches the SD1 solenoid from the timer circuit 110 to the DC amplifier 104 through a 100 kilo-ohm resistor R45 so that the system remains activated only for the duration of the announcement, and is then de-energized.

While particular embodiments of the invention have been shown and described, modifications may be made. It is intended in the following claims to cover all modifications which come within the spirit and scope of the invention.

What is claimed is:

1. In a telephone answering system for responding to telephone messages received over a telephone line and which comprises an announcement storage means and a message storage means and respective associated transducers, and first and second means for driving said announcement storage means and said message storage means respectively relative to said transducers for producing a recorded announcement for the announcement storage means in response to an incoming telephone call and for subsequently recording a message from the calling party on said message storage means, the combination of: an input/output circuit coupled to the telephone line for receiving signals from the telephone line and for transmitting signals to the telephone line; first control circuit means connected to said input/output circuit for activating said announcement storage driving means in response to said incoming telephone call to introduce signals to said input/output circuit corresponding to said recorded announcement for transmission to the calling party; second control circuit means coupled to said announcement storage means for actuating said message storage driving means at the termination of said announcement so as to initiate the recording of the aforesaid message from the calling party on said message storage means, so that successive messages are recorded on said message storage means corresponding to a succession of received telephone calls; third control circuit means including a relay, said third control circuit means having its input connected to said input/output circuit and responsive to a tone signal of a particular frequency received over the telephone line for energizing said relay, said third control circuit means including a section activated by said relay for returning said message storage means to its origin position, fourth control circuit means connected to said message storage driving means for causing said message storage driving means after it has returned to its origin position to move forward and introduce signals to said input/output circuit thereby to transmit the successive messages recorded thereon over the telephone line; and fifth control circuit means activated by said relay and connected to said fourth control circuit means for stopping said message storage means in response to a second tone signal of said particular frequency distinct from the first-mentioned tone signal, said second tone signal being received over the telephone line while said message storage driving means is moving forward under the control of said fourth control circuit means.

* * * * *